(12) United States Patent
Pompier

(10) Patent No.: US 6,944,948 B2
(45) Date of Patent: Sep. 20, 2005

(54) DEVICE FOR SEALING A LUBRICANT RESERVOIR AND METHOD FOR LUBRICATING THE INTERNAL CAVITY OF A TIRE

(75) Inventor: Jean-Pierre Pompier, Greenville, SC (US)

(73) Assignee: Michelin Recherche et. Technique (CH)

( * ) Notice: Subject to any disclaimer, the term of this patent is extended or adjusted under 35 U.S.C. 154(b) by 118 days.

(21) Appl. No.: 10/123,937

(22) Filed: Apr. 17, 2002

(65) Prior Publication Data

US 2002/0117244 A1 Aug. 29, 2002

Related U.S. Application Data

(63) Continuation of application No. PCT/EP00/10054, filed on Oct. 19, 2000.

(30) Foreign Application Priority Data

Oct. 19, 1999 (FR) .............................................. 99 13116

(51) Int. Cl.⁷ ......................... B21D 53/26; B60C 17/10
(52) U.S. Cl. ..................... 29/894.31; 152/521; 152/516
(58) Field of Search ........................... 29/894.3, 894.31; 152/516, 521

(56) References Cited

U.S. PATENT DOCUMENTS

| | | | | |
|---|---|---|---|---|
| 3,850,217 A | * | 11/1974 | Edwards et al. ............. | 152/503 |
| 3,901,301 A | | 8/1975 | Edwards ...................... | 152/330 |
| 3,931,843 A | * | 1/1976 | Edwards et al. ............. | 152/504 |
| 3,946,783 A | * | 3/1976 | Edwards et al. ............. | 152/503 |
| 3,961,728 A | * | 6/1976 | Harris ......................... | 222/180 |
| 3,977,455 A | * | 8/1976 | Swales et al. ............... | 152/521 |
| 3,990,491 A | * | 11/1976 | Hampshire et al. .......... | 152/158 |
| 3,990,492 A | * | 11/1976 | Hyndman et al. ........... | 152/158 |
| 4,003,419 A | * | 1/1977 | Verdier ........................ | 152/312 |
| 4,027,712 A | * | 6/1977 | Verdier ........................ | 152/311 |
| 4,027,713 A | * | 6/1977 | Kenney ....................... | 152/521 |
| 4,051,885 A | * | 10/1977 | French et al. ................ | 152/521 |
| 4,054,168 A | | 10/1977 | Beers et al. ................. | 152/330 |
| 4,077,453 A | | 3/1978 | French et al. ................ | 152/330 |
| 4,212,339 A | * | 7/1980 | Dobson ....................... | 152/158 |
| 4,258,771 A | * | 3/1981 | Snyder ........................ | 152/521 |
| 4,263,953 A | * | 4/1981 | Miceli ......................... | 152/158 |
| 4,294,730 A | * | 10/1981 | Kenney ....................... | 524/13 |
| 4,295,509 A | * | 10/1981 | Stein ........................... | 152/158 |
| 4,304,281 A | * | 12/1981 | Kenney ....................... | 152/454 |
| 4,371,024 A | * | 2/1983 | Stein et al. .................. | 152/158 |
| 4,453,992 A | * | 6/1984 | Kuan et al. .................. | 156/115 |
| 6,619,350 B1 | * | 9/2003 | Dieckmann et al. ......... | 152/156 |
| 2003/0221761 A1 | * | 12/2003 | Cowart et al. ............... | 152/521 |
| 2003/0226628 A1 | * | 12/2003 | Bailey ......................... | 152/158 |

FOREIGN PATENT DOCUMENTS

| | | | | |
|---|---|---|---|---|
| DE | 84 32 017 U | 2/1987 | ........... | B60C/17/06 |
| FR | 2 206 202 | 6/1974 | ........... | B60C/19/00 |
| FR | 2 654 040 | 5/1991 | ........... | B60B/19/08 |
| FR | 2 654 041 | 5/1991 | ........... | B60B/19/08 |

* cited by examiner

Primary Examiner—Essama Omgba
(74) Attorney, Agent, or Firm—E. Martin Remick

(57) ABSTRACT

A method of lubricating a tire cavity and more particularly the interface zone between a safety support and the inside the cavity of a tire enables lubricant to be dispensed in the interface zone only when the mounted assembly comprising the support, the tire and a wheel is in a runflat condition and where the non-instantaneous contact established between the inside surface of the tread and the seal allows the lubrication port to be unblocked. The invention also concerns a lubrication device and a seal enabling the method to be implemented, and a support and a reservoir enabling implementation of the method.

5 Claims, 3 Drawing Sheets

DEVICE FOR SEALING A LUBRICANT RESERVOIR AND METHOD FOR LUBRICATING THE INTERNAL CAVITY OF A TIRE

This is a continuation of International Application PCT/EP00/10054, with an international filing date of Oct. 19, 2000, which further claims priority to French Application 99/13116, with a filing date of Oct. 19, 1999.

BACKGROUND OF THE INVENTION

The present invention concerns a mounted assembly comprising a wheel rim, a safety support and a tire able to roll along a certain distance at zero pressure with the inside part of the tread supported by the safety support. More particularly, the invention concerns a method for lubricating the interfacial zone between the inside part of the tire tread and the support. It also concerns a lubricating device and a seal which enables said method to be put into effect, as well as a support and a reservoir that enable the method to be implemented.

Safety supports for vehicle wheels mounted with tires are well known. The document EP 0 796 747 describes an example of such a support consisting of a circular body adapted for fitting onto a wheel rim of a vehicle. The example illustrated in that document is made mainly from a vulcanized rubber mix some areas of which are reinforced, for example by metallic or textile wires or cables. Needless to say, other materials can be used to make such a support.

In general, safety supports are mounted on a wheel rim inside a tire to provide a support for the crown of the tire when it is rolling at low or zero pressure, for example after a blow-out. This avoids direct contact between the tire and the wheel rim, which generally results in rapid deterioration of the tire. Thus, supports improve the safety of the vehicle by allowing rolling for a certain time so that a suitable place where repairs can be effected may be found.

To allow rolling in conditions of low or zero pressure, it is greatly preferable to provide lubrication in order to avoid premature deterioration of the contact and friction zones, which are subjected to relatively high temperatures. Lubricants of known types, such as silicones, are used for this purpose.

A number of devices that enable such lubrication to be effected are already known. For example, the document FR 2 206 202 describes a device comprising a reservoir that can contain a lubricant. The reservoir is sealed by a thermally fusible plug whose melting point is between about 60° C. and about 120° C. When the tire is rolling while 'flat', the temperature increase produced by friction causes the plug to melt or at least to soften, and this unblocks the outlet. Such a device has certain functional limitations. For example, it sometimes occurs that the temperature of a tire increases even at normal pressure, up to levels that can cause the plug to melt. The lubricant is then ejected out of the reservoir and this can give rise to various types of problems, for example problems of non-uniformity, depletion of lubricant reserves, etc.

Document FR 2 654 040 describes a wheel in which a reservoir is provided that is sealed by a contact plate which releases the lubricant liquid when the tire tread comes into contact with the wheel rim. This device has the disadvantage that it releases liquid even in the event of instantaneous or transient contact, for example when the tire is subjected to an impact.

Document FR 2 654 041 describes a wheel in which a reservoir is provided in the form of a bellows sealed by a feeler: when the tire tread makes contact with the wheel rim, the feeler breaks and this then releases the lubricant liquid. Since the breaking conditions of the feeler are difficult to reproduce repetitively, breaking can take place in a range of conditions. This range embodies an uncertainty about when the lubrication will be triggered. Besides, the feeler cannot be removed because it has to be broken in order to release the liquid.

SUMMARY OF THE INVENTION

An object of the present invention is to overcome these various disadvantages, notably by allowing lubricant to be dispensed into the interface zone only when the mounted assembly is in a condition of 'flat' rolling and without breaking the seal.

According to a first aspect of the invention, a mounted assembly comprises a wheel rim and a safety support disposed against the rim inside the cavity of a tire. A method is provided for lubricating the cavity of the tire and more particularly the interface zone between the support and the tire, said mounted assembly also comprising a reservoir of lubricant in fluid communication with said interface zone via a lubrication port closable by a seal, said assembly being able either to be in a condition of rolling with the tire inflated, a condition in which the pressure inside the cavity is at least sufficient to avoid other than momentary contact between the inside of the tire tread and the safety support, or to be in a condition of flat rolling, a condition in which the pressure inside the cavity is such that the inside of the tire tread is in substantially prolonged contact with the safety support, said method allowing lubricant to be dispensed in said contact zone only when the mounted assembly is in the flat rolling condition, and comprising the following steps:

providing a quantity of lubricant in said reservoir;

placing a moveable seal against the lubrication port, such that:

when the mounted assembly is rolling while the tire is inflated, said port remains closed and the lubricant remains in the reservoir; and when the mounted assembly is rolling while the tire is in the flat condition, the non-transient contact established between the inside surface of the tire tread and the seal enables the removal of the seal.

Advantageously, the removal of the seal requires substantially simultaneous conditions of temperature increase in the tire cavity and mechanical contact between the seal and an internal portion of the tire for a predetermined minimum time.

Advantageously, the seal is held in place detachably by means of a thermally fusible adhesive applied between the seal and an adhesion surface surrounding the port.

This lubrication method avoids emptying of the reservoir when the presence of lubricant is not needed. In fact, it is namely the combined effect of temperature increase and mechanical friction between the collapsed tire and the seal that allows the lubrication port to be unblocked.

Thus, if the tire temperature increases without flat rolling conditions actually being present, the adhesive may sometimes reach its softening point but the absence of mechanical force, for example a shear stress caused by friction, allows the seal to remain in place and to continue blocking the lubrication port. Therefore, there is no accidental leakage of lubricant into the tire cavity.

The adhesive should preferably reach a temperature of at least about 100° C. to enable removal of the seal. Preferably, this temperature corresponds to the temperature developed at the support/tire tread interface after the passage of an initial temperature build-up period during which flat rolling has taken place without lubrication or with only a basic lubrication, for example pre-applied to the inside of the tread or to the support. This minimizes the risk of lubricant leakage other than in the flat rolling condition.

According to another feature of the invention, a sealing device is also provided for a lubricant reservoir for a mounted assembly comprising a wheel rim and a safety support disposed against the rim inside the cavity of a tire, said reservoir having a lubrication port to provide fluid communication between the inside of said reservoir and the cavity of said tire, said device comprising:

- an adhesion surface disposed on at least part of the surround of the outer extremity of the port;
- a seal removably placed against the adhesion surface so as to close said port, the retention of said seal on said adhesion surface being provided by a thermally fusible adhesive.

Advantageously, the melting temperature of the adhesive is at least equal to about 100° C.

Besides the advantages mentioned earlier, the device according to the invention is simple to make and use, inexpensive, and easy to integrate into known type supports without significant modifications at the level of those supports.

Advantageously, the adhesion surface to which the seal can be applied protrudes relative to the body of the reservoir. Preferably, the contour of the seal substantially matches the contour of the adhesion surface.

According to another aspect of the invention a safety support is also provided for a mounted assembly comprising a wheel rim and a tire defining a cavity, said assembly being capable either of a rolling condition with the tire inflated, where the pressure inside the cavity is at least sufficient to avoid other than momentary contact between the inside of the tire tread and the safety support, or of a condition of rolling flat, where the pressure inside the cavity is such that the inside of the tire tread comes into substantially prolonged contact with the safety support, said support being able to accommodate a reservoir of lubricant for said mounted assembly, said reservoir having a lubrication port that can provide fluid communication between the inside of the reservoir and the cavity of said tire when said assembly is assembled, said port being disposed in the interface zone between said support and the inside portion of the tread of the tire when it is rolling while flat. Said support comprises an adhesion surface disposed on at least part of the surround of the outer end of said port, against which a seal can be removably placed, the retention of said seal on said adhesion surface being provided by a thermally fusible adhesive.

According to a further aspect of the invention, a lubricant reservoir is also provided for the mounted assembly comprising a wheel rim, a safety support and a tire, said reservoir comprising:

- a housing capable of accommodating a quantity of lubricant;
- a port that provides fluid communication between the inside of said reservoir and the wheel cavity when said reservoir is assembled in said mounted assembly;
- an adhesion surface disposed on at least part of the surround of the outer extremity of said port, against which a seal can be removably placed, the retention of said seal on said adhesion surface being provided by a thermally fusible adhesive.

DESCRIPTION OF THE DRAWINGS

Other characteristics and advantages of the invention will emerge from the description presented below of a lubrication device according to the invention, which is given as a non-limiting example referring to the attached drawing, which shows.

DETAILED DESCRIPTION OF THE INVENTION

Figure 1:
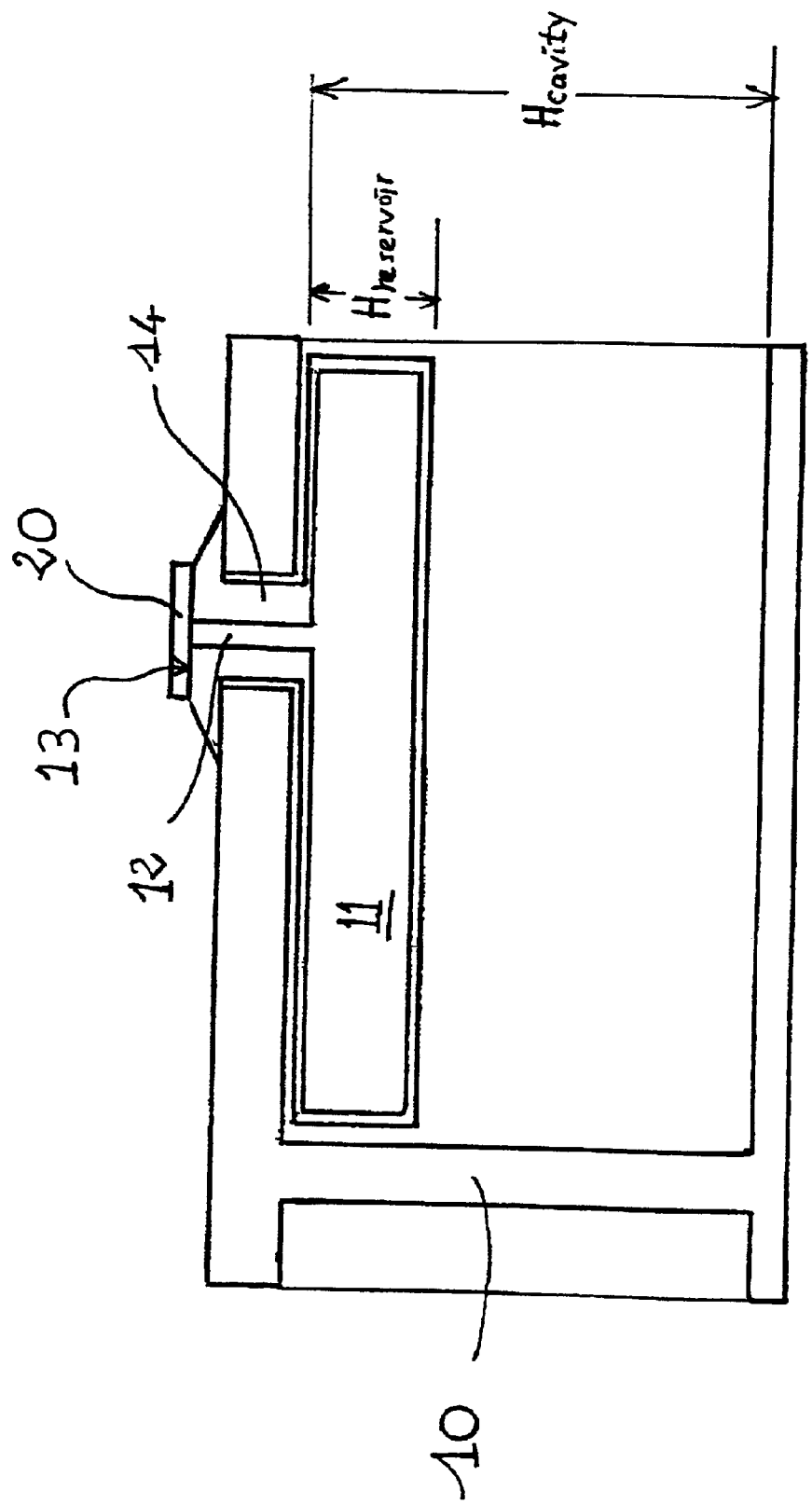
FIG. 1: Sectional view showing the cross-section of a support in which is disposed a reservoir.

In the example embodiment illustrated in FIG. 1, a reservoir 11 is disposed in a safety support 10 of known type. The document EP 0 796 747 describes an example of such a support. In particular, it comprises cavities or recesses provided mainly to minimize weight and/or heating. One, or preferably several reservoirs 11 are disposed in the cavities and distributed circumferentially around the support. Advantageously, the reservoir is made using a material that can withstand a certain amount of deformation. Thus, if the support is subjected to a load sufficient to deform it, the reservoir will deform in the same way without being changed. In an advantageous example embodiment the reservoir is made of polypropylene. This provides good resistance to elevated temperatures. The reservoir could also be made from other materials such as plastics, composites, or even metals such as aluminum.

Advantageously, the height "$H_{reservoir}$" of the reservoir is smaller than the height "$H_{cavity}$" of the cavity in the support. Thus, the ratio $H_{reservoir}/H_{cavity}$ may be smaller than 0.8, but is preferably less than 0.5. In particular, this avoids any accidental leakage of lubricant when the support is temporarily deformed, for example as the result of an impact.

Figure 3:
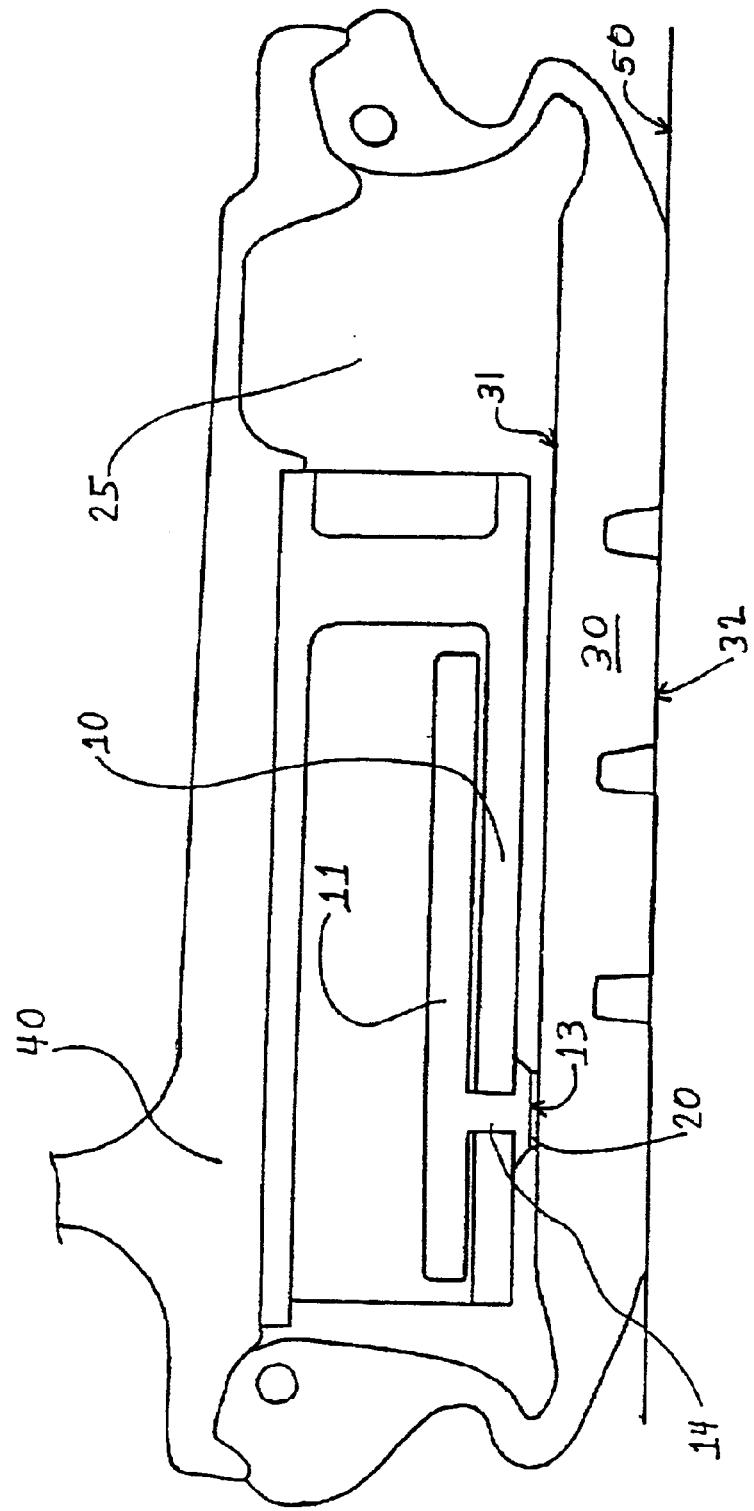
FIG. 3: Sectional view illustrating a mounted assembly in a condition of flat rolling, before the seal has been removed from the lubrication port.

A port 12 allows the reservoir to be in fluid communication with the cavity 25 of the tire or wheel. Preferably, the port is positioned so that its free end is within the interface zone between the radially outer part of the support 10 and the inside portion 31 of the tread 32 of the tire 30 when the latter is in a flat rolling condition. This feature is illustrated in FIG. 3. A tubular channel 14 allows the lubricant to flow from the reservoir to the outside of the support through an opening in a wall of the support. An adhesion surface 13 is disposed on the surface substantially adjacent to the free end of the lubrication port. Advantageously, this surface extends all the way round the port.

Figure 2:
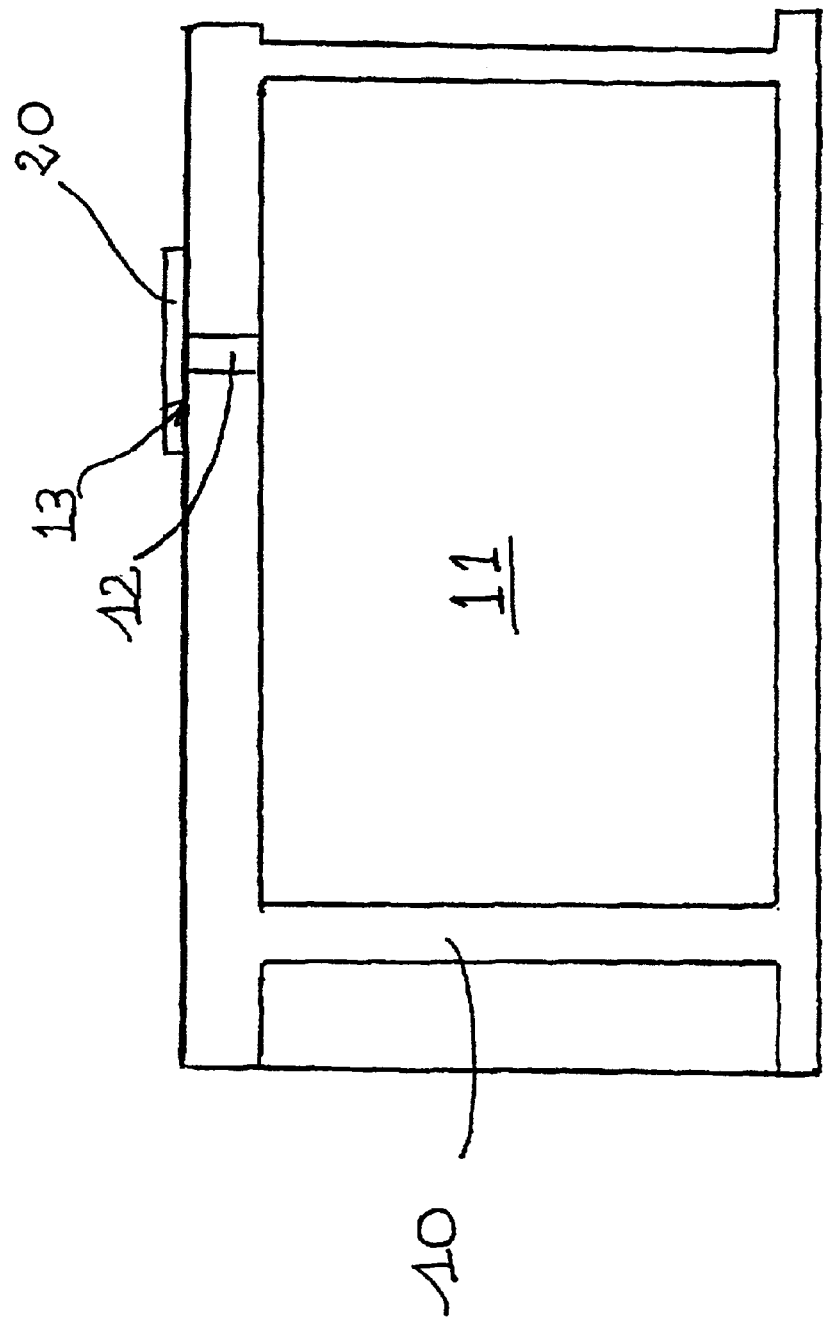
FIG. 2: Similar view of a support that also serves as a reservoir.

FIG. 2 illustrates another example embodiment in which an internal cavity of the support serves as the reservoir. The lubrication port 12 communicates directly with the surface it is desired to lubricate. The adhesion surface 13 is provided on the outside face of the support, around the port.

On the basis of the examples described, the lubrication method according to the invention is presented in what follows. In either of the examples described, the reservoir 11 is filled with lubricant. It may be found advantageous to limit the filling level, for example to half the total capacity of the reservoir. Thus, in the event of a momentary deformation of the support as the result of an impact, the presence of air in the reservoir allows its deformation to be absorbed without causing a sudden increase of the pressure level. According to a variant, the height of the reservoir is smaller than that of the cavity formed in the support. By height is meant the radial distance between the bottom and top surfaces of the reservoir or the support. The free space between the bottom of the reservoir and the support can serve as a damping zone when the support undergoes an impact. Thus, with such variants, if the support is subjected to impact the lubricant does not undergo a sudden pressure increase that could suddenly eject it out of the reservoir. In a variant (not illustrated), the reservoir is located radially close to the wall of the support that has the shortest radius. In this variant, there is a free space between the top of the reservoir and the support wall whose radius is largest. This free space also serves as a damping space in the event of impact.

The reservoir is preferably filled through the lubrication port. It would also be possible to provide a specific filling opening, for example one with a larger diameter to facilitate filling. This could then be sealed by a plug of known type, for example a screw-plug or crimped plug. After filling the reservoir with an appropriate quantity of lubricant, the lubrication port can be sealed. For this purpose a seal 20, which may for example be in the form of a disc or patch, is bonded to the adhesion surface 13. The seal may be made either from a material similar to that of the reservoir or from a different material. Thus, for example, the seal could be made from polypropylene, aluminum, etc.

To bond the seal in place it is preferable to use a thermally fusible adhesive such as that marketed under the name SIANOLITE.

It will be understood, therefore, that the adhesion surface 13 and the corresponding face of the seal are both shaped so as to ensure leak proof sealing of the reservoir. For example, two substantially flat surfaces enable bonding to be carried out easily and reliably.

The support and reservoir prepared in this way can be mounted on the wheel rim and the tire can then be mounted as well.

In a variant, adhesive bonding is replaced by a soldering stage. The assembly produced by said soldering is designed to be capable of coming apart under the action of heat. The parting temperature is advantageously about 100° C. or an even higher temperature.

Several situations can arise during rolling. First of all, the tire may have to roll over a sizeable obstacle such as a stone, a pothole or suchlike. Rolling over such an obstacle may result in a large deformation of the tire, such that the inside of the tire tread comes into contact with the support 10. This contact can be relatively hard, depending on the size of the obstacle and/or the speed of the vehicle. If the support is deformed by the impact at a circumferential position where a reservoir is located and if the reservoir is less high than the cavity, or even if the height of the reservoir is substantially comparable to that of the cavity in the support but it is only partly full so as to leave a "buffer" potion filled with air, then either, in the first case, the reservoir will not be touched or deformed, or, in the second case, the air present in the reservoir will allow the impact to be absorbed and the reservoir to be deformed without the ejection of any lubricant through the lubrication port. In such a situation the seal 20 will remain bonded to the adhesion surface 13 and the assembly will normally remain leak proof. The centrifugal force undergone by the lubricant is insufficient to displace the seal.

In a second situation, there may be a temperature increase of the tire, either because the road is very hot or because the vehicle is driven in a very sporty way with much stress on the tire, but still without a loss of tire pressure. This temperature increase may perhaps soften the adhesive retaining the seal. In the absence of friction forces between the inside portion 31 of the tread and the seal 20, the seal will remain in place. In effect, softening of the adhesive alone is not enough to remove the seal. There must also be a mechanical force. On the other hand, the centrifugal force undergone by the lubricant is insufficient to free the port; the residual adhesion force of the adhesive is greater than the force exerted by the lubricant.

This is all the more practicable when the diameter or area of the port is small relative to the diameter or effective area of the seal, so as to leave a larger area available for the adhesion surface. Thus, in an advantageous way, the ratio between the port and adhesion surface areas is less than 0.8 and preferably less than 0.5. In an advantageous embodiment the diameter of the seal is 10 mm and that of the port is 2 mm.

Finally, again during rolling, the tire many lose pressure such that the inside portion 31 of its tread comes into contact with the support 10. The crushed zone of the tire 30 is then substantially constantly in contact with the support. If rolling continues, the parts in contact quickly become hot. Heating takes place mainly because the elements in contact, namely the inside of the tread and the radially outer surface of the support, have different diameters. The heating increases the temperature of the seal adhesive and when the adhesive reaches its melting point, the friction forces between the inside of the tread and the support are generally sufficient to displace the seal, either by detaching it completely or at least partially, for example moving it to one side of the lubrication port. The port now opened allows the lubricant, under the centrifugal force inherent in the rotation of the wheel, to emerge from the reservoir and lubricate the interface zone and/or the rest of the tire cavity. With a given configuration, tests have shown that a flat rolling distance of the order of 3 km is enough to trigger the lubrication. This distance may well vary depending on the size and arrangement of the device, the rolling conditions, etc.

To assist the displacement of the seal by friction forces when the tread has collapsed, the thickness of the seal is preferably more than 0.2 mm.

Lubrication of the wheel cavity and more particularly the interface zone between the support and the inside of the tread makes it possible to reduce the friction between the two elements in contact, limit the temperature increase and ultimately delay the deterioration of the tire. The use of tires of known type which allow flat rolling over a certain distance with lubrication in accordance with the method and/or a device according to the invention, allows rolling to continue when the tire pressure is very low or zero, for a given distance.

Applicant understands that many other variations are apparent to one of ordinary skill in the art from a reading of the above specification. These variations and other variations are within the spirit and scope of the instant invention as defined by the following appended claims.

What is claimed is:

1. A method of lubricating an interface zone between a safety support and a tire mounted as an assembly comprising the following steps:

a) providing the tire, the safety support and a wheel rim, b) mounting the tire on the wheel rim having the safety support disposed against the rim and inside a cavity of the tire, c) providing a reservoir within a cavity of said safety support of lubricant in fluid communication with said interface zone via a lubrication port, d) closing said reservoir by a removable seal, e) providing a quantity of lubricant in said reservoir, f) placing said removable seal against said lubrication port, such that said port remains closed and the lubricant remains in said reservoir when the mounted assembly is rolling while the tire is inflated, g) establishing a non-transient contact between the inside surface of the tire and said seal when the mounted assembly is in the flat rolling condition, and h) removing said seal by said non-transient contact between the inside surface of the tire and said seal, and whereby removing said seal requires a substantially simultaneous condition of a temperature increase in the tire cavity and of a mechanical contact between said seal and the inside portion of the tire, whereby said method allows lubricant to be dispensed in said interface zone only when the mounted assembly is in the flat rolling condition.

2. The method of claim 1, wherein the step of placing said removable seal against said lubrication port further comprises the steps of:

a) applying a thermally fusible adhesive having a melting temperature of at least about 100° Celsius to an adhesion surface located around said port, and b) bonding said seal to said lubrication port with said thermally fusible adhesive.

3. The method of claim 2, wherein the step of removing said seal further comprises the step of heating said thermally fusible adhesive to a temperature at least equal to about 100° Celsius.

4. The method of claim 1, wherein the step of placing said removable seal against said lubrication port further comprises the step of:

a) providing a bonding solder having a melting temperature of at least about 100° Celsius, and b) soldering said seal to said reservoir with said bonding solder.

5. The method of claim 4, wherein the step of removing said seal further comprises the step of heating said bonding solder to a parting temperature at least equal to about 100° Celsius.

* * * * *